4 Sheets—Sheet 1.

A. H. EMERY.

HYDRAULIC-PRESS.

No. 7,791. Reissued July 17, 1877.

WITNESSES

Chas. J. Gooch

A. H. Galt

INVENTOR

Albert H. Emery

By Wright Brothers Attorneys

A. H. EMERY.

HYDRAULIC-PRESS.

No. 7,791. Reissued July 17, 1877.

WITNESSES

Chas J. Gooch

A. H. Galt

INVENTOR

Albert H. Emery

By Singer & Bros Attorneys

A. H. EMERY.

HYDRAULIC-PRESS.

No. 7,791. Reissued July 17, 1877.

WITNESSES

Chas. J. Cooke

A. H. Galt

INVENTOR

Albert H. Emery

By Knight Bros Attorneys

A. H. EMERY.
HYDRAULIC-PRESS.
No. 7,791. Reissued July 17, 1877.
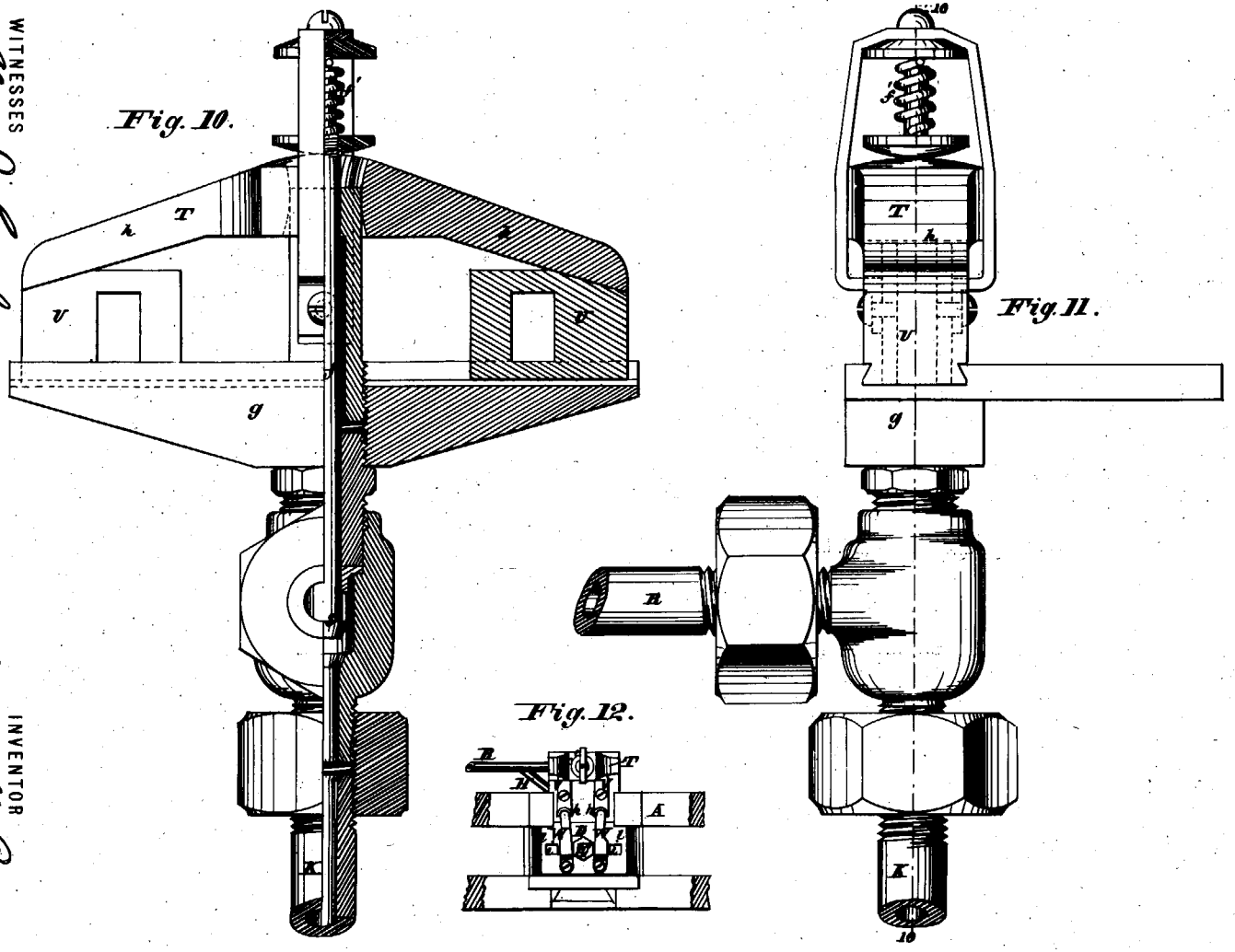
WITNESSES
Chas. J. Gooch
A. H. Galt
INVENTOR
Albert H. Emery
By Knight Bros. Attorneys

UNITED STATES PATENT OFFICE.

ALBERT H. EMERY, OF NEW YORK, N. Y.

IMPROVEMENT IN HYDRAULIC PRESSES.

Specification forming part of Letters Patent No. 63,875, dated April 16, 1867; Reissue No. 7,791, dated July 17, 1877; application filed March 24, 1877.

DIVISION B.

*To all whom it may concern:*

Be it known that I, ALBERT H. EMERY, of the city, county, and State of New York, have invented certain new and useful Improvements in Hydraulic Presses, of which the following is a specification:

This invention relates to a new and improved hydraulic press, designed more especially for baling purposes. It is constructed with a plurality of hydraulic rams, arranged to act consecutively on a platen, and imparting thereto the sum of their own strokes, with increased pressure toward the latter part of the stroke.

The invention further relates to devices for admitting water to the rams, and controlling the movement of the platen.

Figure 1:
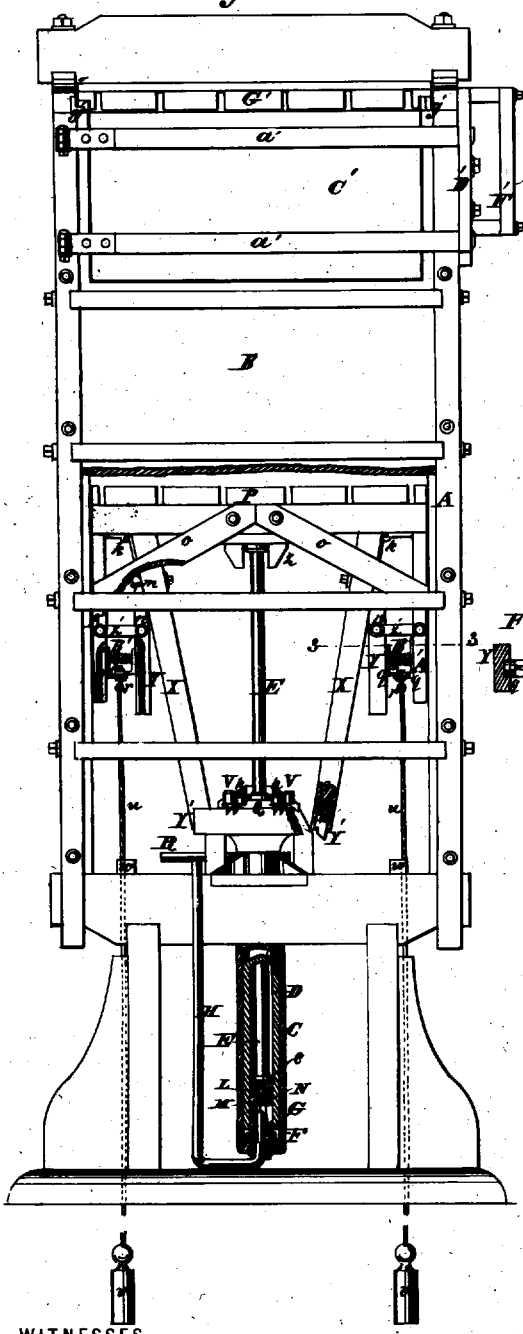
Figure 2:
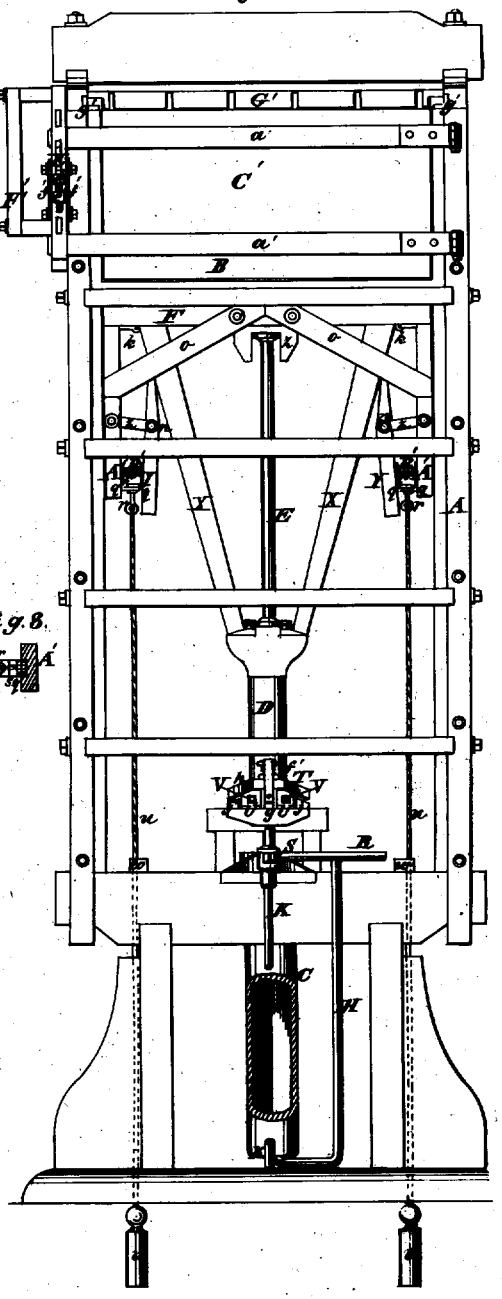
Figure 3:
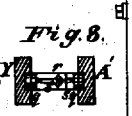
Figure 4:
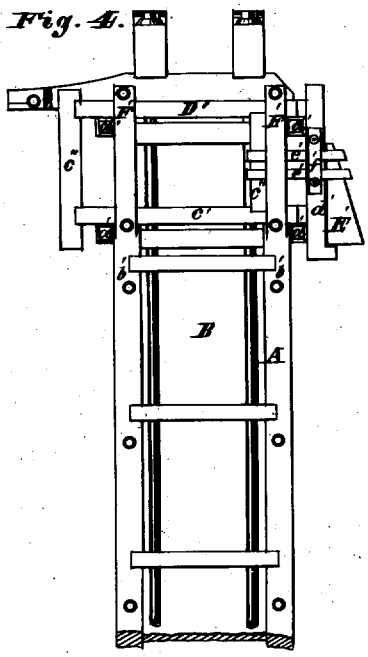
Figure 5:
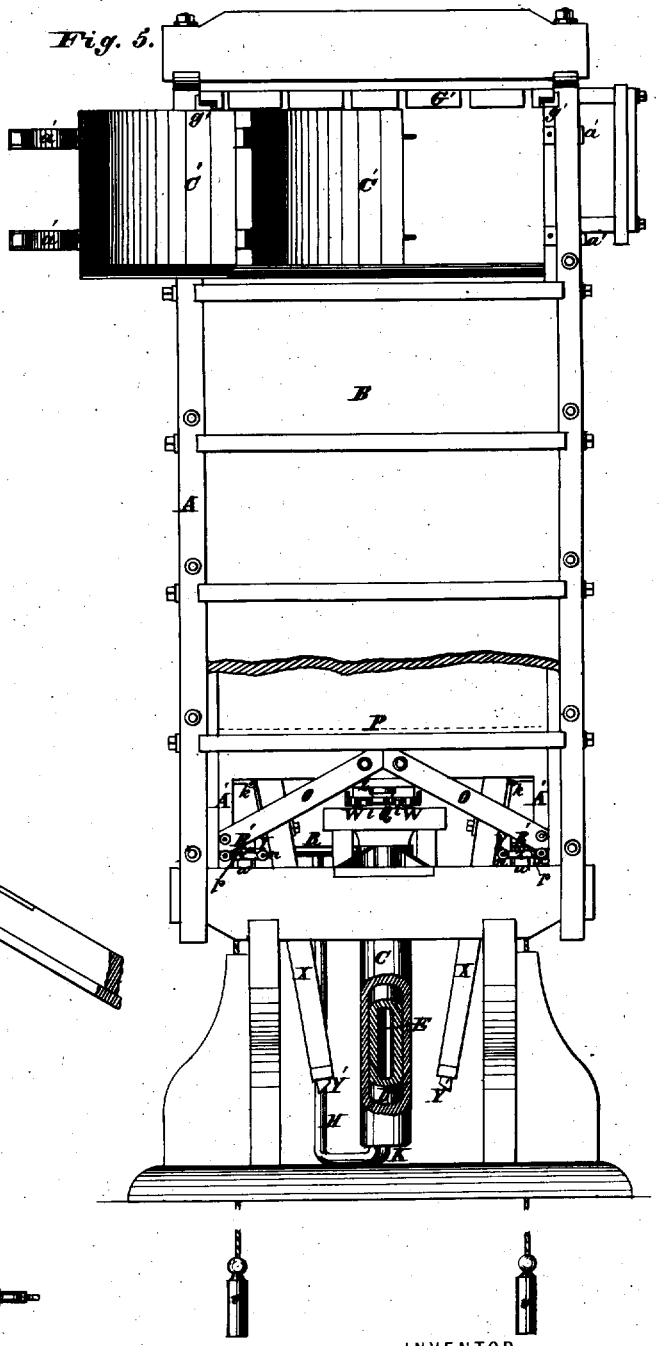
Figure 6:
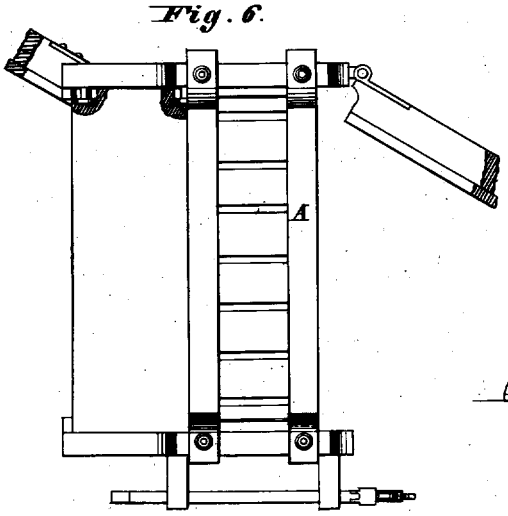
Figure 7:
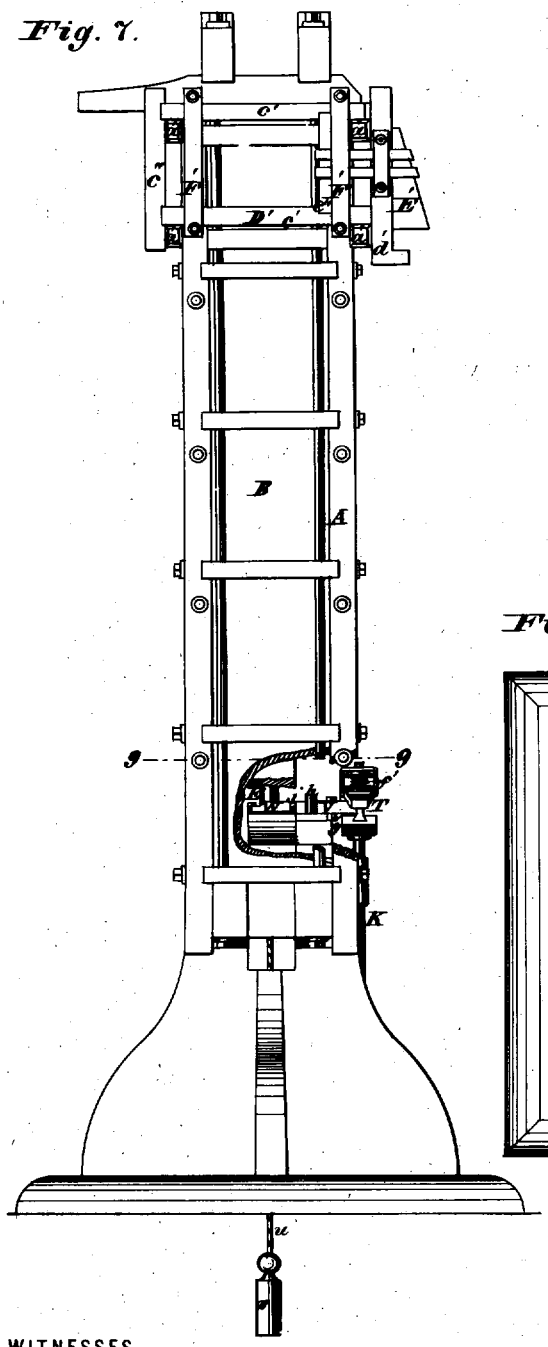
Figure 8:
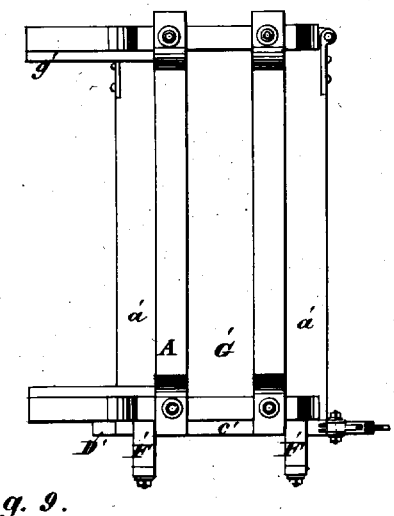
Figure 9:
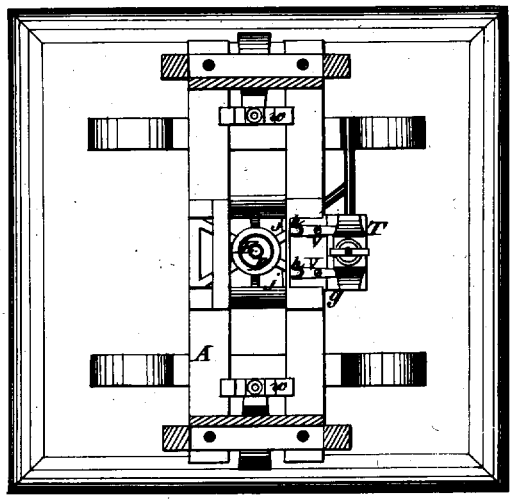

In the accompanying drawings, Figure 1 is an elevation showing the platen part way up. Fig. 2 is an elevation with the platen in its highest position. Fig. 3 is a horizontal section on the line 3 3, Fig. 1, of a detached portion on a larger scale. Fig. 4 is a side view of the upper part. Fig. 5 is a front elevation with the platen in its lowest position. Fig. 6 is a top view. Fig. 7 is a side view, partly in section. Fig. 8 is a top view. Fig. 9 is a horizontal section on the line 9 9, Fig. 7. Fig. 10 is a front elevation, on a larger scale, of the valve-operating mechanism, partly in section, on the line 10 10, Fig. 11. Fig. 11 is a side elevation of the same. Fig. 12 is a detached plan or top view of the compress-ram head and adjoining parts.

A represents the framing of the press, and B the press-box. These parts may be constructed in any proper manner to insure strength and durability. C represents an upright cylinder, secured in the lower part of the framing A. This cylinder is of cast-iron, closed at its bottom, and has fitted within it a cylinder, D, which is allowed to rise and fall freely, and constitutes what I term a "compress-ram." (See more particularly Figs. 1 and 5.) Within the cylinder D there is a rod, E, which I term a "packing-ram," the rod or ram E being allowed to work water-tight in the cylinder C by means of a packing, F, secured in position by a ring, G, which is screwed into the lower end of D, the packing F being clamped between a shoulder on the ring and the lower end of the ram D, as shown in Fig. 1. H is a water-supply pipe, which passes up through the bottom of the cylinder C, and through the ring G in the bottom of the compress-ram D, and the leakage of water around the pipe H, and through the ring is prevented by a packing, which is fitted around the upper end of the pipe H, within a recess in the upper surface of the ring G, and secured or clamped in position by a ring screwed into the recess of the ring G, as shown clearly in Fig. 1. K is a water-supply pipe, which communicates with the lower part of the cylinder C, as shown in Figs. 2 and 5. The lower end of the ram E has a nut, L, screwed upon it, with a recess in its under side to receive a cap, M, between a shoulder on which and the lower end of nut L a packing, N, is secured or clamped by screwing up cap M. The upper end of the nut L abuts against a collar, *e*, on the rod or ram E, which collar serves as a stop, as will be hereinafter described.

P is the platen of the press, which is fitted and works in the press-box B. The upper end of the rod or ram E bears against the under side of the platen P, and it will be seen that when water is forced through the pipe H into the lower part of the compress-ram D the water will act against the ram E, (which I term the "packing-ram,") as previously alluded to, and the platen P will be raised until the stop *e* comes in contact with a nut, Q, in the head of the compress-ram, at which time the compress-ram D is made to rise by water entering the lower end of the cylinder C through pipe K, and acting against the bottom of D.

The two supply-pipes H K are connected at their upper parts by a pipe, R, (see Fig. 2,) the water being forced into pipe R by a pump, as usual. The pipe R communicates with the pipe K just above the valve S, the stem *f* of which passes up through a fixed plate, *g*, on the framing A, and through a cross-head, T, the arms *h h* of which incline downward, as shown in Figs. 2 and 10. Between the cross-head T and the fixed plate *g* there are interposed two sliding wedges, U U, in which the outer ends of levers V V are fitted, said levers V having their fulcra in the plate *g*, and their inner ends made or formed with recesses *h h*, as shown in Fig. 9, to receive the ends of levers W W, which are attached to the upper end or head of the ram D, said head having two notches or recesses, *i i*, made in it, (shown in Fig. 12,) the use of which will be presently explained. At the inner edge of the fixed plate *g* there are vertical projections *j j*, which serve as rests for what I term "lifters," X X. These lifters are attached to the under side of the platen P by hinges or joints *k k*, as shown in Figs. 1, 2, and 5, and in the lower end of each lifter there is fitted an elastic or yielding pawl, Y′, (shown clearly in Fig. 1,) said pawls having their under surfaces inclined or beveled, so that they may be readily forced upon inclined surfaces *l l* on the compress-ram head D, and be made to catch into the recesses *i i*, made in said surfaces. To the platen P, at about the center of one side of the same, there is attached a pendent wedge, Z. (Shown clearly in Figs. 1 and 2.)

On the upper part of the stem *f* of the valve S there is a spring, *f′*, which has a tendency to keep said valve closed. In the outer side of each lifter X, near its upper end, there is connected, by a hinge or joint, *m*, a lever, Y. These levers Y Y have their fulcra *n* in metal straps *z z*, which are attached to pendent arms A′ A′, secured to the ends of the platen P, said arms working in contact with the sides of the press-box, and braced by bars *o o*, as shown in Figs. 1 and 2. Between the levers Y and the pendent arms A′, to which they are attached, there are placed springs B′. These springs are fitted on rods *p*, which pass through plates *q q*, arranged so that they may slide or expand and contract, the plates being of L form, and connected by a bolt, *r*, which passes through oblong slots *s*. (See Fig. 3.) These plates *q* are fitted in vertical grooves made in the levers Y and pendent arms A′, and to the bolts *r* cords *u* are attached, said cords extending down through the base of the framing of the press, and having knobs or weights *v* attached to them. In the lower part of the framing of the press, and about on a level with the top of cylinder C, there are inserted cross-bars *w w*, which serve as stops. These stops are in line with the plates *q q* and springs B′, and their use will be shown in the operation of the several parts. At the upper part of the press-box B there are two doors, C′ C′, hinged at one end. These doors are provided with longitudinal battens *a′*, which extend beyond the disengaged ends of the doors, and, when the doors are closed, extend beyond the posts *b′* of the framing, so that a clamp-frame, D′, may be fitted thereon. This clamp-frame is of rectangular form, and constructed of four bars, *c′ c′ c″ c″*, framed together, the upper and lower horizontal bars *c′* extending beyond one of the side bars *c″*, and having a vertical bar, $d^1$, fitted on them, the ends of the bars *c′* having tenons made on them to fit in mortises in the bar $d^1$. To the vertical bar *c″*, which is near the tenons on the ends of the bars *c′*, two metal straps or loops, *e′ e′*, are attached, the lower strap being a trifle longer than the upper one. The bar $d^1$ passes through the loops *e′ e′*, and is retained in position by guide-plates *f′*, attached to the sides of $d^2$, over the loops *e′*. (See Figs. 4 and 7.) E′ is a key or wedge, which is fitted in the loops *e′ e′*, and, when driven up in said loops, serves to clamp the two doors C′ C′ in a closed state. The clamp-frame D′ is fitted in guides F, which admit of it being adjusted on and off from the ends of the battens *a′* with facility, and always retain said frame in proper position. On the upper part of the press-box B there is a sliding top or head plate, G, which works on ways or guides *g′ g′*, which admit of it being readily moved or adjusted over and off from the top of the press-box.

The operation of the press, so far as the action of the water upon the two rams D E is concerned, has been previously alluded to in a brief manner, simply to define or render clear the construction of the rams. I will now proceed to describe the operation throughout. In the first place, we will suppose the platen P to be down to its fullest extent in the press-box B, as shown in Fig. 5. When the platen is in this position, the springs B′ are above the fulcra *n* of the levers Y, and have a tendency to press the lifters X X toward the head of the ram D, and the valve S is in a closed state, as the pendent wedge Z, attached to the platen, is between the levers W, and, when the platen reached its lowest point in descending, forced or spread apart said levers, and moved the levers V V, which, in turn, actuated the wedges U U, moving them inward or toward the valve-stem *f*, so that the spring *f′* forced the valve S down upon its seat.

The springs B′ are above the fulcra *n* of the levers Y, on account of the plates *q*, Figs. 1 and 2, having come in contact with the stops *w* previous to the platen reaching its lowest point. The doors C′ C′ are opened, the head-plate G′ raised to one side of the press-box, and the latter filled with the substance to be compressed, the doors being closed and the head-plate shoved back over the press-box, the doors being firmly secured in a closed state by adjusting the clamp-frame D′ over the ends of the battens *a′*, and driving the key E′ up in the loops *e′ e′*. Water is then forced into the pipe R by means of the usual pump, provided with a valve, as usual, graduated to suit the pressure required, and the valve S being closed, the water passes down the pipe H and up into the ram D, and acts against the ram E, raising the same, and consequently the platen P, and packing or pressing the substance within the press-box.

The ram E rises until the collar *e* comes in contact with the rest Q on the ram-head D, at which time the lower ends of the lifters are pressed over the head of the ram D by the springs B′, and the pawls Y′ are thrown into the recesses *i i* in the head of the ram D, and the lower ends of the lifters in this movement strike the levers W W and actuate the levers V V, so that the latter will move the sliding wedges U U outward and raise the cross-head T, and thereby open the valve S, so that the water will pass down the pipe K and up into the lower part of the cylinder C, and, acting against the ram D, will elevate it, said ram, through the medium of the lifters X X, acting upon the platen P, which, under the pressure of the ram D, acts with an increased power, owing to its greater area, the motion being reduced, of course, in proportion to the increase of power. Thus, in the first instance, the platen acts or moves more rapidly under the pressure of ram E, owing to its small area, and this is termed the "packing-ram," as it simply compacts or presses the loose substance in the press-box and prepares it to receive the increased pressure of the larger ram D, which, in consequence of its greater power, I term the "compress-ram." At the time the compress-ram D reaches its highest or culminating point, the springs B′ will be below the fulcra *n* of the levers Y, on account of the knobs or weights *v* coming in contact with the base of the framing of the press before the platen reaches its highest point. The substance being thus compressed, the doors C C are opened, the compressed substance bound and removed from the press-box, and the two rams allowed to descend by permitting a discharge of the water from within cylinder C and the ram D through pipe R, and the platen P, descends, the lower ends of the lifters X coming in contact with the rests *j*, which retain the lifters and platen until the head of ram D descends sufficiently to allow the pawls Y′ of the lifters X to be free from the recesses *i i* in the head of ram D, when the springs B′, in consequence of being below the fulcra *n*, as shown in Fig. 2, throw the lifters off from the head of ram D, and the platen descends to its lowest point, the wedge Z passing between the levers W W, and actuating the levers V V, so that the latter will move toward each other, the sliding wedges U U, and allow the spring *f′* to close the valve S. The plates *q q*, just previous to the platen reaching its lowest point of descent, come in contact with the stops *w*, and cause the springs B′ to be adjusted above the fulcra *n* of the levers Y, as shown in Fig. 5, and all the parts will then be in the position described at the commencement of the operation.

Having thus described my invention, the following is what I claim as new and desire to secure by Letters Patent:

1. A plurality of rams, acting consecutively on a platen, and imparting the sum of their own respective strokes with increased pressure at the latter part of the stroke.

2. The combination of the pipes H K, valve S, and concentric rams E and D.

3. The levers V V, sliding wedges U U, and valve S, arranged to operate in the manner substantially as and for the purpose set forth.

4. The lifters X X, platen P, and compress-ram D, combined and arranged to operate substantially as and for the purpose specified.

5. The combination of the lifters X X, compress-ram D, and levers Y, arranged to operate substantially as and for the purpose set forth.

6. The sliding wedges U U, platen P, levers W W *v v*, spring *f′*, and valve S″, combined and arranged to operate substantially as and for the purpose specified.

7. The platen P and lifters X X, in combination with the levers Y Y and springs B′, arranged to operate substantially as and for the purpose set forth.

8. The springs B′, arranged with the levers Y Y, stops *w*, and cords *u*, to operate substantially as and for the purpose specified.

9. The lifters X X, pawls Y′ at the ends of the lifters X X, the recess *i* in the compress-ram D, and the fixed rests *j j*, all combined and arranged to operate substantially as and for the purpose specified.

10. The combination of the clamp-frame D′, wedge E′, and the loops *e′ e′*, substantially as and for the purpose set forth.

ALBERT H. EMERY.

Witnesses:
OCTAVIUS KNIGHT,
JONATHAN EDWARDS.